United States Patent [19]

Karbo et al.

[11] 4,160,234
[45] Jul. 3, 1979

[54] ABNORMAL TIRE CONDITION SENSING SYSTEM

[75] Inventors: Donald J. Karbo, Shaker Heights; David A. Betts, Euclid; Lyle A. Pauer, Rocky River, all of Ohio

[73] Assignee: Gould Inc., Rolling Meadows, Ill.

[21] Appl. No.: 671,471

[22] Filed: Mar. 29, 1976

[51] Int. Cl.² .............................................. B60C 23/06
[52] U.S. Cl. ................................. 340/58; 73/146.5; 200/61.23; 310/338
[58] Field of Search ............ 340/58; 200/61.22, 61.23, 200/61.25; 73/146.4, 146.5; 310/8.1, 8.5, 8.8, 9.1, 314, 338, 339, 348

[56] References Cited

U.S. PATENT DOCUMENTS

| | | | |
|---|---|---|---|
| 3,185,960 | 5/1965 | Howard | 340/58 |
| 3,588,815 | 6/1971 | Koonce | 340/58 |
| 3,713,092 | 1/1973 | Ivenbaun | 340/58 |
| 3,760,351 | 9/1973 | Thomas | 340/58 |
| 3,786,413 | 1/1974 | Ross et al. | 340/58 |
| 3,787,806 | 1/1974 | Church | 340/58 |
| 4,075,603 | 2/1978 | Snyder et al. | 340/58 |
| 4,117,452 | 9/1978 | Snyder et al. | 340/58 |

Primary Examiner—John W. Caldwell, Sr.
Assistant Examiner—Joseph E. Nowicki
Attorney, Agent, or Firm—Russell E. Baumann; Edward E. Sachs

[57] ABSTRACT

A self powered tire condition indicator system is disclosed. The system comprises a plurality of wheel mounted transmitting assemblies which communicate by a radio frequency transmission to a receiver located within the operator compartment of a vehicle. Each of the transmitting assemblies generates its own transmitting power by converting the mechanical compression of a flat tire into electrical energy. The electrical energy is used to generate an intermittent characteristic tone associated with a deflated tire condition by the frequency modulation of a carrier.

12 Claims, 5 Drawing Figures

ABNORMAL TIRE CONDITION SENSING SYSTEM

BACKGROUND OF THE INVENTION

1. Field of the Invention

The invention pertains generally to systems for sensing or indicating an abnormal condition of a vehicular tire and is more particularly directed to such systems using radio frequency transmissions for signaling.

2. Description of the Prior Art

In the prior art numerous devices and apparatus have been suggested for sensing or indicating an abnormal condition in a vehicular tire. These include low pressure devices that indicate underinflation and minimum pressure devices that indicate a substantially complete loss of air or a flat.

One method of sensing an abnormal tire condition has been to provide a fluid pressure sensitive switch inside the tire and attached to either the wheel rim or tire sidewall. As the abnormal condition, such as a drop or loss of fluid pressure, develops the switch will operate to provide a warning signal. This warning signal can subsequently be communicated to a receiver monitor close to the operator of the vehicle to alert him of the condition.

Problems incurred with the fluid pressure sensitive switches are numerous in that they are mechanical and need adjustment and are not as reliable as one may prefer. For example, the opening communicating the air pressure to the device may become clogged or the spring actuator may become rusted because of moisture entering the device. The fluid pressure sensitive switch is not rugged enough to provide totally reliable service in the exposed locations that vehicle tires must operate in.

This is especially true for those fluid pressure devices which attach to the valve stems of the vehicle where no protection whatsoever is afforded. Another problem inherent with the valve stem operated pressure sensitive device is the provision of an additional place from which to leak air. Thus, they may contribute to the very condition the apparatus was attached to warn against.

The signals from the pressure operated switches have, in the past, been communicated to a centrally located monitor by either radio wave or contacting wires. If contacting wires are used, the problem of transmitting a signal from a rotating device presents itself. This has been accomplished laboriously in the past with slip rings or the like. On the other hand and if radio waves are used, there are the difficulties of powering the transmitter and not interferring with other communication facilities that may be nearby. Many of the transmitter indicators include batteries that have a limited operational cycle and require replacement at certain intervals.

A further problem having to do with previous indicators is that they are not particularly well adapted to the recent developments concerning "run-flat" tires. The new run-flat tires generally provide a small inner insert having a load bearing surface on which a vehicle may be driven for a reasonable time and speed while the tire is deflated. The new "run-flat" designs therefore, eliminate the need for spare vehicle tires but increase the difficulty of determining when a tire has lost its pressure.

It would be advantageous to provide a deflated tire condition indicating apparatus overcoming the problems faced in the prior art and which could also be easily integrated with a "run-flat" insert.

SUMMARY OF THE INVENTION

The invention provides a self-contained and self powered abnormal tire condition sensing system for a tire. The tire condition sensing system comprises a transmitting assembly with an energy generating transducer for powering a wheel module circuit that transmits a radio frequency abnormal condition signal to a receiver located in proximity to the operator of the vehicle. The radio frequency transmission eliminates the need for a direct physical connection between the transmitting assembly and receiver, thereby solving the problem of communicating information from a revolving source, i.e., a tire. Further, the reliability of the system is enhanced as the unit is mounted within the tire insert and has no external connections to the harsh external environment a tire must operate in. Another advantage of the system is that modification of the tire, wheel, or chassis is unnecessary. The system is installed when the "run-flat" insert is mounted on the wheel and the receiver is placed within the operator compartment.

The transducer converts the mechanical compression of the tire insert caused by a deflated tire condition into electrical energy. This production of energy, which is an indication of the deflated tire condition, eliminates the need for an external or peripheral power source such as a battery. The system thus obviates the problem of servicing the transmitting assembly to replace parts with a limited shelf life. Additionally, false signals are eliminated as the system will not communicate with the receiver unless an abnormal condition exists to generate the energy needed to produce the signal.

A charge storage release circuit included in the transmitting assembly of the invention produces a pulsed abnormal condition signal. The charge storage portion of the circuit stores the electrical energy produced by the transducer until a predetermined quantity of power is stored. The release portion of the circuit then operates to power the wheel module circuit to transmit for a short length of time. This intermittent operation allows a smaller transducer to be used and causes less hindrance to surrounding communication facilities than would a continuous operation.

Therefore, it is a general object of the invention to provide an improved abnormal tire condition indicating system.

It is another object of the invention to provide an abnormal tire condition indicating system which is easily integrated into a wide variety of wheel assemblies including those which have a "run-flat" insert.

It is an additional object of the invention to provide a radio frequency abnormal tire condition indicating system.

Still further, it is an object of the invention to provide a radio frequency signaling system with an intermittent operation.

These and other objects, features, and advantages of the invention will be more fully understood and appreciated upon reference to the following detailed description taken in conjunction with the appended drawings wherein:

DETAILED DESCRIPTION OF THE PREFERRED EMBODIMENT

Figure 1:
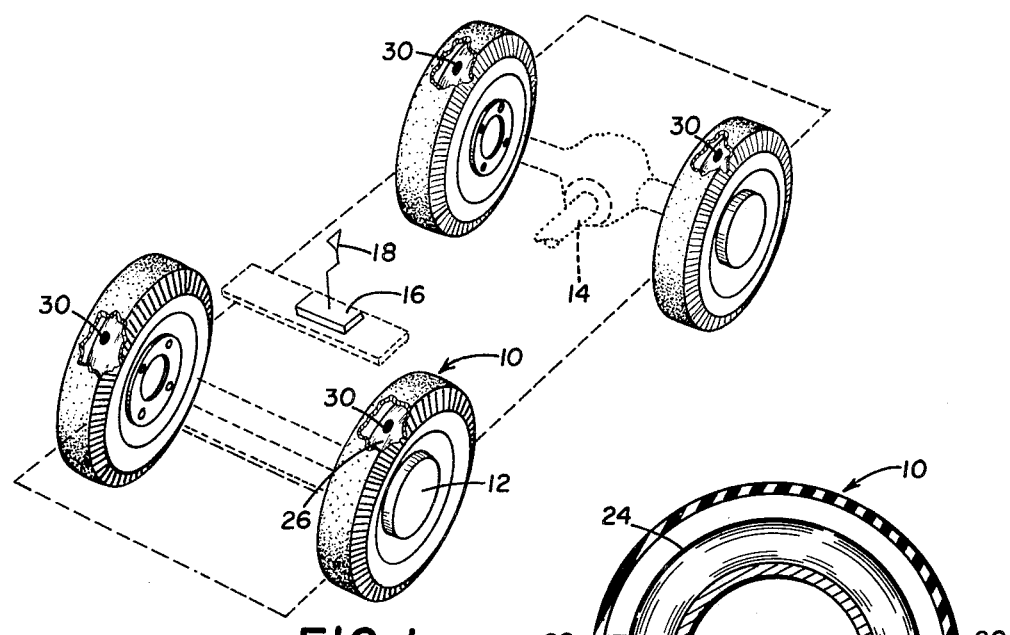
FIG. 1 is a pictorial schematic in partial cross-section of a vehicle incorporating an abnormal tire condition indicating system constructed in accordance with the invention.

With reference now to FIG. 1, there is shown a vehicle having a plurality of pneumatic tires 10 that are inflatable with a fluid such as air. The tires 10 are generally mounted on wheel assemblies 12 which support a chassis structure 14 that is illustrated in phantom in the drawing.

Associated with each tire 10 is a transmitting assembly 30 that is self contained, in the embodiment shown, within a "run-flat" insert 26 of each tire. However, assembly 30 is equally adaptable to use in more conventional tire and wheel assemblies as will be readily appreciated by those skilled in the art. Each transmitting assembly 30 utilizes a radio frequency transmission to communicate with a receiving antenna 18 and a receiver 16. The receiver is adapted to decode the transmissions of the transmitting assemblies 30 and to provide a warning, either audible or visible, to the operator of the vehicle that an abnormal condition, deflation of a tire, has occurred. The invention provides this warning without using connecting wires or cables that are difficult and expensive to install.

The receiver may be of conventional design including amplifiers and frequency selective circuitry. It is possible in some instances to use the vehicle's radio antenna for the receiving antenna 18 or an external antenna of suitable design may be employed.

It should also be understood that the utility of the device should not be confined to a passenger vehicle as shown in FIG. 1 but is applicable to the other uses of pneumatic tires including trucks, buses, airplanes, and the like.

Figure 2:
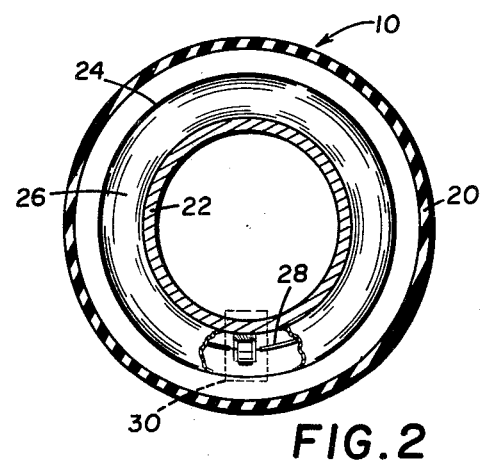
FIG. 2 is a pictorial elevational view in partial cross-section of a vehicular wheel having a transmitting assembly for the system of FIG. 1.

FIG. 2 illustrates the mounting of the transmitting assembly within the tire 10. There illustrated in cross-section is the tire casing 20 and a "run-flat" insert 26 of generally smaller but similar shape to the casing 20 mounted upon a wheel rim 22. The "run-flat" insert 26 allows the vehicle to be driven without serious handicaps to safety or equipment on a load bearing surface 24 for a reasonable distance and time. When the tire 10 becomes deflated and the vehicle is being supported on the load bearing surface 24, the transmitting assembly 30, mounted between the surface 24 and the wheel rim 22, will signal the receiver 16 of the fact via transmitting antenna 28. The transmitting antenna 28 preferably is a submultiple of the wavelength of the transmitting frequency, i.e., ¼, ½ wavelength and follows the contour of the insert. The transmitting assembly 30 and antenna 28 are shown molded integrally with the insert 26. This protects the assembly 30 and antenna 28 from the exposure to road contaminants and other hazards.

Figure 3:
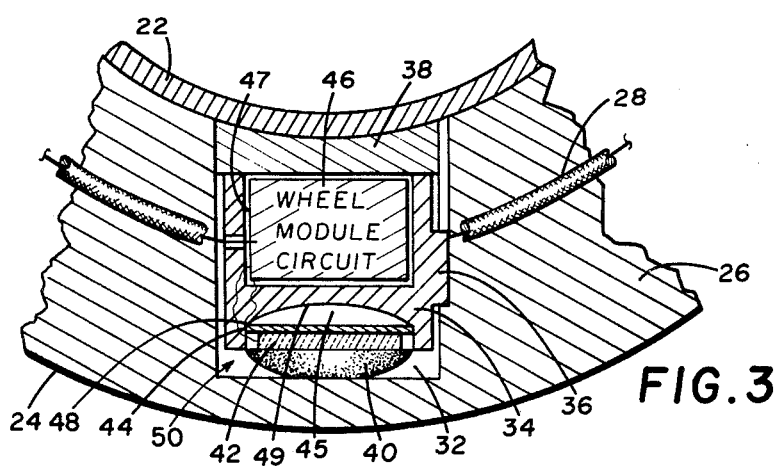
FIG. 3 is an enlarged fragmented elevational view in cross section of the transmitting assembly of FIG. 2.

The mounting of the transmitting assembly 30 is shown to better advantage in an enlarged fragmentary view in FIG. 3. The size of the transmitting assembly in relation to the insert has been exaggerated to clearly indicate its operation. The transmitting assembly 30 comprises an energy producing transducer generally designated 50 having a circular wafer of piezoelectric ceramic material 42 bonded to a metallic disk 44. When the transducer is flexed or deformed a voltage is generated between the wafer 42 and disk 44. Preferably, transducer 50 is comprised of a commercially available piezoelectric generator. As the specifics of this generator do not themselves form a part of the present invention, further elaboration thereon is deemed unnecessary. Additionally, associated with the transducer 50 is an elastomeric button 40 which is formed from some durable rubber material or the like.

The transmitting assembly 30 further comprises a generally cylindrical mounting member 34 that fits into a molded cylindrical cavity 32 of the insert 26 and is held in position by a key 36. Preferably the cavity 32 is formed with a slight taper to allow easy molding and insertion of the transmitting assembly. The mounting member may be formed of metal or plastic of a light weight to lessen any tire imbalance.

The elastomeric button 40, piezoelectric wafer 42, and metallic disk 44 form a combination which rests on the bottom of cavity 32 and also slides partially into a recessed portion 45 and rests on a shoulder 48 of the mounting member 34. The recessed portion 45 is shaped to allow the wafer and disk to deform but not beyond their elastic limit. A curved portion 49 of the recess limits movement of the combination so maximum voltage may be generated without producing a destructive flexure of the combination. The transducer may then produce a voltage of approximately 80 volts from a flexure in the order of 0.015 inches. The duration of the energy generated is determined by the speed of the vehicle during the operation of the circuit but is on the order of millisec pulses with a positive and a negative polarity.

The mounting member 34 further includes a cylindrical chamber 47 which contains a wheel module circuit 46. The wheel module circuit contains the transmitting circuitry necessary to generate an abnormal condition signal to the receiver 16 and may be electrically interconnected with the transducer 50 by appropriate lead wires. It is seen that the transmitting assembly is entirely self-contained and takes a minimal amount of space. The portion of cavity 32 which is not filled by the transmitting assembly 30 is occupied by a filler plug 38 which allows the button 40 to remain in contact with the bottom of the cavity 32.

When an abnormal condition occurs and the operator is driving on a deflated or overloaded tire where the tire profile deflection is greater than an acceptable maximum deflection when supporting a vehicle, the load bearing surface 24 of the "run-flat" insert 26 will be carrying the weight of the vehicle. As the wheel rim 22 revolves and the portion of the insert 26 containing the transmitting assembly 30 is compressed, the button 40 will deform the wafer 42 and disk 44. This deformation will cause a voltage to be generated to the wheel module circuit that is one polarity while the transducer 50 is deformed and the opposite as it is released. The energy is generated for every revolution of the insert 26 and used to power the transmitting circuitry.

Figure 4:
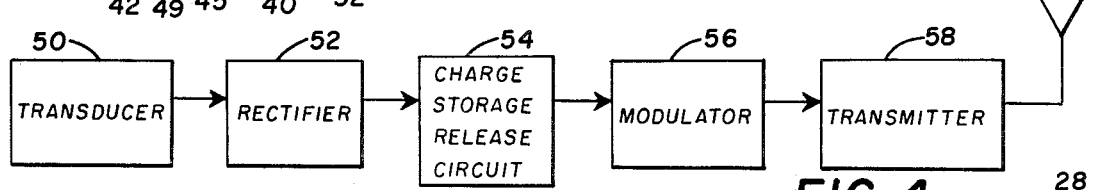
FIG. 4 is a system block diagram for the electronic portion of the transmitting assembly illustrated in FIG. 3.

The wheel module circuitry 46 is further illustrated in FIG. 4 and comprises a rectifier 52, a charge storage release circuit 54, a modulator 56, and a transmitter 58.

The energy produced by the transducer 50 is rectified by the rectifier 52 and stored in the charge storage portion of the circuit 54. When sufficient charge or power has accumulated to power the modulator 56 and transmitter 58, the release portion of the circuit 54 turns the power on. The abnormal tire indication transmission then takes place via antenna 28 until the stored energy in circuit 54 has been used. The cycle is repeated at periodic intervals as additional revolutions of the wheel rim 22 cause additional voltage pulses to be generated by transducer 50 to thereby provide more energy for charging storage release circuit 54. This intermittent activity is advantageous in that it is not as disruptive to other communications as a solid or continuous signal would be and as mentioned above significantly eliminates false signaling.

Figure 5:
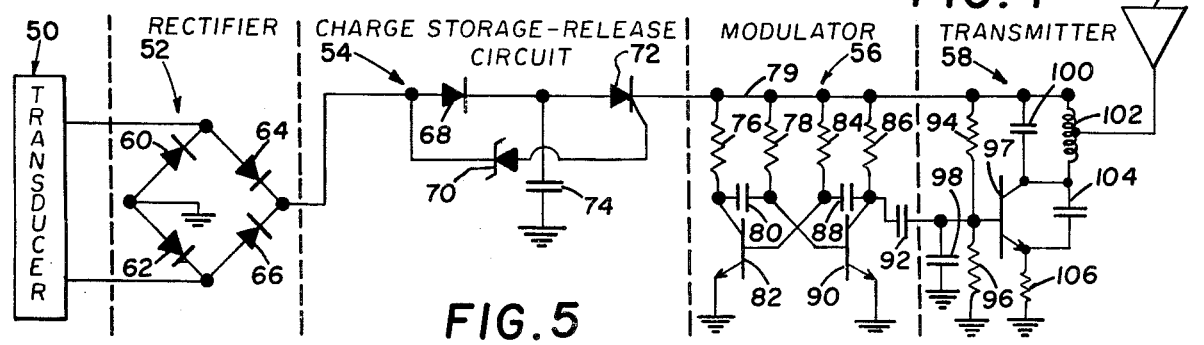
FIG. 5 is a detailed schematic view of the electronic portion of the transmitting assembly illustrated in FIG. 4.

With attention directed to the more detailed schematic of FIG. 5, there is illustrated the transducer 50 connected to the rectifier 52 comprising diodes 60, 62, 64, and 66 that form a full wave bridge. The full wave bridge configuration is to take advantage of the full voltage energy output by the transducer including its positive and negative peaks. The energy pulses from the rotation of the wheel are thusly converted into pulses of direct current that are stored in a capacitor 74 which is connected to the rectifier 52 through a diode 68. The capacitor 74 which is the charge storage portion of the charge storage-release circuit 54 will continually increase in voltage to a point where enough energy has been stored to operate the modulator 56 and the transmitter 58. To provide for a milliwatt output of the transmitter the capacitor is in the range of 12 volts and 50 $\mu$ fd. in capacity. It is understood if more or less power is to be stored the values will change accordingly.

The voltage on the capacitor 74 is continually monitored by the release portion of the charge storage release circuit 54 which comprises a switching device 72 preferably a SCR or the like, a diode 68, and a triggering device preferably a zener diode 70 or the like. In operation the zener diode 70 will remain non conductive until the capacitor 74 exceeds the reverse breakdown voltage characteristic of the zener diode. At that time the zener diode 70 will conduct and transmit a trigger signal to the gate of the switching device, SCR 72, to turn the device on. The operation of the SCR will supply power from the capacitor 74 to the modulator 56 and the transmitter 58 via the cathode of the SCR along power supply line 79.

A transmission will continue until the voltage on the capacitor 74 drops sufficiently to turn the SCR 72 off and begin the charging cycle once again.

The modulator 56 can encompass any circuitry for generating a characteristic modulation tone and is shown preferably to comprise a astable multivibrator with the collector of a NPN transistor 82 connected to a load resistor 76. The load resistor 76 is connected to the power line 79 at its other terminal. Likewise a second half of the multivibrator comprises NPN transistor 90 having a collector connection to a load resistor 86 which is connected at the opposite terminal to the power line 79.

The transistors 82, 90 each have an associated timing circuit comprising a resistor 84, a capacitor 88 and a resistor 78, a capacitor 80, respectively, connected to their base terminals. The frequency of the modulation tone is determined by the RC time constants of these two circuits and can be different for individual tires.

The modulation signal is capacitively coupled to the transmitter 58 by a capacitor 92 connected at one terminal to the collector of transistor 90 and at the other to the base of transistor 97.

The transmitter 58 comprises a radio frequency type oscillator for generating a carrier suitable for frequency modulation. Preferably the oscillator is comprised of NPN transistor 97 having a tank circuit with inductor 102 and a capacitor 100 connected to the collector of the transistor 97. The antenna is connected to the inductor 102 at a tap. The tank circuit determines the carrier frequency of the transmitter. A resistor 96 connected between the base of transistor 97 and ground assists in biasing the oscillator. A capacitor 104 further provides a feedback loop for the oscillator and is connected between the emitter and collector of the transistor 97. A resistor 106 is connected between the emitter of transistor 97 and ground.

A voltage divider including a resistor 94 connected between power supply line 79 and one terminal of a resistor 96, which is connected to ground at the other, provides the biasing network for the base of the transistor 97 and is connected to the center point of the divider. A capacitor 98 is additionally connected between the center point of the divider and ground for the purpose of filtering.

The transmitter is designed to produce a milliwatts output in the radio frequency band which can be in the 50-100 Megahertz range. The transmitting distance should be kept within 50 feet to insure that interference will be kept to a minimum.

While the preferred embodiment of the invention have been disclosed with reference to a "run-flat" type of tire, it will be understood that various modifications obvious to one skilled in the art can be made thereto without departing from the spirit and scope of the invention as covered by the appended claims. For example, transmitting assembly 30 could be mounted within the tire by any number of convenient means for use in more conventional tires and wheel assemblies which do not include the "run-flat" insert. In such alternative arrangements, transducer 50 would be activated by an abnormal condition where the profile deflection is greater than an acceptable maximum amount due to tire under inflation, overloading or the like. Operation of the subject new system would then be the same as described in detail hereinabove.

What is claimed is:

1. An abnormal tire condition indicating system comprising:

transducer means including a piezoelectric crystal means for producing electrical energy in response to mechanical pressure exerted by the rotation of a tire resulting from an abnormal condition in said tire;

transmitter means powered by the energy produced for transmitting a radio frequency abnormal condition signal;

receiver means adapted to receive and recognize said abnormal condition signal for providing a warning of the condition;

charge storage means for storing the energy generated by the transducer means, said charge storage means including rectifier means for transforming the electrical energy of the transducer means into direct current pulses and capacitor means connected to the rectifier means for storing said direct current pulses; and release means for releasing the energy stored by the charge storage means to the transmitter means.

2. An abnormal tire condition indicating system as defined in claim 1 wherein said release means includes a switching device, responsive to a release signal, for providing energy stored in said capacitor means to said transmitter means; and triggering means, connected to said switching device and said capacitor means, for generating said release signal when a predetermined amount of energy has been stored in said capacitor means.

3. An abnormal tire condition indicating system as defined in claim 2 wherein said switching device is a silicon controlled rectifier (SCR) with an anode terminal, cathode terminal, and gate terminal.

4. An abnormal tire condition indicating system as defined in claim 3 wherein said triggering means includes a zener diode connected to the gate terminal of the SCR.

5. An abnormal tire condition indicating system as defined in claim 4 wherein said triggering means further includes a diode in series with said switching device and poled for conduction in the direction of said switching device.

6. An abnormal tire condition indicating system as defined in claim 2 wherein said transmitter means includes a transmitter circuit for generating a carrier frequency in the radio frequency band; a modulator circuit for producing a lower frequency signal with which to modulate the carrier frequency; and an antenna connected to the output of the transmitter circuit for transmitting said modulated carrier frequency as the abnormal condition signal.

7. An abnormal tire condition indicating system as defined in claim 6 wherein the modulation of the carrier frequency is frequency modulation.

8. An abnormal tire condition indicating system as defined in claim 7 wherein the antenna is molded into a "run-flat" insert mounted within the tire.

9. An abnormal tire condition indicating system as defined in claim 8 wherein the system is contained within a "run-flat" insert mounted within the tire and wherein the transducer means are activated by the insert bearing the weight of the vehicle.

10. An abnormal tire condition indicating system comprising:

transducer means for detecting an abnormal tire condition and for producing electrical energy in response to said detected abnormal condition in a tire;

transmitter means powered by the energy produced for transmitting a radio frequency abnormal condition signal;

receiver means adapted to receive and recognize said abnormal condition signal for providing a warning of the condition;

charge storage means for storing the energy generated by the transducer means; and, release means for releasing energy stored by the charge storage means to the transmitter means.

11. An abnormal tire condition indicating system adapted for use in a vehicle wheel assembly of the type including a wheel rim having an outer peripheral surface and a tire mounted to and surrounding said rim with said tire defining an internal annular tire cavity and wherein said tire is inflated to a predetermined level and has a maximum acceptable profile deflection for supporting a vehicle load, said indicating system comprising:

a transmitting assembly having means for mounting said transmitter assembly to said wheel assembly within the confines of said tire cavity, said transmitting assembly including a transducer for detecting an abnormal tire condition in response to said tire having greater than said maximum profile deflection and for producing electrical energy in response to said abnormal tire condition, charge storage means for storing the electrical energy generated by said transducer, release means for releasing the electrical energy stored in said charge storage means at preselected intervals, and signal transmitting means operably interconnected with at least said charge storage means for selective energization from a non-transmitting condition to a transmitting condition in response to selective release of electrical energy from charge storage means.

12. An abnormal tire condition indicating system adapted for use in a vehicle wheel assembly of the type including a wheel rim having an outer peripheral surface and a tire mounted to and surrounding said rim with said tire defining an internal annular tire cavity and wherein said tire is inflated to a predetermined level and has a maximum acceptable profile deflection for supporting a vehicle load, said indicating system comprising:

a transmitting assembly for sensing an abnormal condition in said tire and having means for mounting said transmitter assembly to said wheel assembly within the confines of said tire cavity, said transmitting assembly including a transducer for producing electrical energy with said transducer being energized in response to said tire having greater than said maximum profile deflection, charge storage means for storing the electrical energy generated by said transducer, said charge storage means including rectifier means for transforming the electrical energy of the transducer means into direct current pulses and capacitor means connected to the rectifier means for storing said direct current pulses, release means for releasing the electrical energy stored in said charge storage means at preselected intervals, and signal transmitting means operably interconnected with at least said charge storage means for selective energization from a non-transmitting condition to a transmitting condition in response to selective release of electrical energy from charge storage means.

* * * * *